United States Patent
Skelly et al.

(10) Patent No.: US 6,824,213 B2
(45) Date of Patent: Nov. 30, 2004

(54) PASSENGER SEAT WITH SEAT ELECTRONICS UNIT AND BEAM THEREFOR

(75) Inventors: Trevor B. Skelly, Winston-Salem, NC (US); Glenn A. Johnson, King, NC (US)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 10/424,461

(22) Filed: Apr. 28, 2003

(65) Prior Publication Data

US 2004/0212228 A1 Oct. 28, 2004

(51) Int. Cl.[7] .............................................. A47C 31/00
(52) U.S. Cl. ............................... 297/217.3; 297/452.2; 297/452.13
(58) Field of Search ........................ 297/452.18, 452.2, 297/217.3, 217.4, 217.6, 452.13, 216.6; 244/122 R, 129.1; 248/188.1, 188.8

(56) References Cited

U.S. PATENT DOCUMENTS

| | | | |
|---|---|---|---|
| 3,885,766 A | * | 5/1975 | Resch et al. ............. 248/188.1 |
| 5,409,186 A | * | 4/1995 | Chow |
| 5,522,641 A | * | 6/1996 | Infanti |
| 5,553,923 A | * | 9/1996 | Bilezikjian |
| 5,560,683 A | | 10/1996 | Penley et al. |
| 5,567,017 A | * | 10/1996 | Bourgeois et al. |
| 5,660,443 A | * | 8/1997 | Pedronno |
| 5,667,179 A | * | 9/1997 | Rosen |
| 5,911,478 A | * | 6/1999 | Goodman |
| 5,984,415 A | * | 11/1999 | Schumacher et al. |
| 6,007,036 A | * | 12/1999 | Rosen |
| 6,059,364 A | | 5/2000 | Dryburgh et al. |
| 6,179,381 B1 | * | 1/2001 | Gevaert |
| 6,352,311 B1 | * | 3/2002 | Hayotte |

* cited by examiner

Primary Examiner—Milton Nelson, Jr.
(74) Attorney, Agent, or Firm—Adams Evans P.A.

(57) ABSTRACT

A passenger seat includes in-flight entertainment (IFE) equipment. A seat set is mounted on a frame which is supported on a laterally-extending beam. One or more seat electronics units are contained in housings shaped and sized to fit in the interior of the beam and are mounted within the beam. Cables enter the beam at appropriate locations and connect the seat electronics units to the IFE hardware or to other aircraft circuits.

17 Claims, 5 Drawing Sheets

PASSENGER SEAT WITH SEAT ELECTRONICS UNIT AND BEAM THEREFOR

TECHNICAL FIELD AND BACKGROUND OF THE INVENTION

This invention relates to an aircraft passenger seat, particularly an aircraft passenger seat incorporating an in-flight entertainment unit.

Many aircraft passenger seats are now being equipped with in-flight entertainment (IFE) equipment such as speakers, headsets, video displays, and controllers, which provide passengers with entertainment such as movies and television, video games, Internet connectivity, and music. IFE equipment often requires processing, switching, or routing equipment in addition to the hardware that the passenger directly interacts with. This equipment typically takes the form of a seat electronics unit comprising a housing mounted to the underside of a multiple-seat unit. Unfortunately, in this location the seat electronics unit intrudes into the space otherwise used for under-seat storage of luggage and other carry-on items. This reduces the already-limited amount of storage available and exposes the seat electronics unit to damage if items are forced into the storage area.

Accordingly, there is a need for a passenger seat that has improved protection of a seat electronics unit and enhanced use of space.

SUMMARY OF THE INVENTION

The above-mentioned need is met by the present invention, which according to one embodiment, provides a beam assembly for a passenger seat, comprising a hollow body having a first end for being mounted to a first seat frame, a second end for being mounted to a second spaced-apart seat frame, and a central portion disposed between the first and second ends for being mounted to a seat base disposed centrally below the first and second seat frames. At least one seat electronics unit is disposed inside the hollow body.

According to another embodiment of the present invention, at least one cable is disposed inside the hollow body and connected to the electronics unit.

According to another embodiment of the present invention, the body of the beam has a cross-section comprising a plurality of sides.

According to another embodiment of the present invention, the body of the beam has a triangular cross-section.

According to another embodiment of the present invention, the body of the beam has a four-sided cross-section.

According to another embodiment of the present invention, the body of the beam comprises carbon fibers.

According to another embodiment of the present invention, the body of the beam comprises aluminum.

According to another embodiment of the present invention, the body of the beam comprises an amorphous alloy.

According to another embodiment of the present invention, a passenger seat frame assembly comprises first and second spaced-apart seat frames, each of which defines a curved shape corresponding to the profile of an anatomically-appropriate seat bottom and defines first and second beam mounting points respectively. A seat base is provided for being attached to a supporting surface, the seat base having a central beam mounting point disposed between the first and second beam mounting points. A beam comprises a hollow body having a first end, a second end, and a central portion disposed between the first and second ends, wherein the first end is attached to the first beam mounting point, the second end is attached to the second mounting point, and the central portion is attached to the central beam mounting point. At least one seat electronics unit is disposed inside the hollow body.

According to another embodiment of the present invention, a passenger seat comprises first and second spaced-apart seat frames, each of which defines a curved shape corresponding to the profile of an anatomically-appropriate seat bottom and defines first and second beam mounting points respectively. A seat base for being attached to a supporting surface is provided, the seat base having a central beam mounting point disposed between the first and second beam mounting points. A beam is provided comprising a hollow body having a first end, a second end, and a central portion disposed between the first and second ends, wherein the first end is attached to the first beam mounting point, the second end is attached to the second mounting point, and the central portion is attached to the central beam mounting point. A diaphragm is positioned under tension between the first and second seat frames for providing a continuous seat bottom and seat back support surface for a seat occupant. At least one seat electronics unit is disposed inside the hollow body.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DESCRIPTION OF THE PREFERRED EMBODIMENT AND BEST MODE

Figure 1:
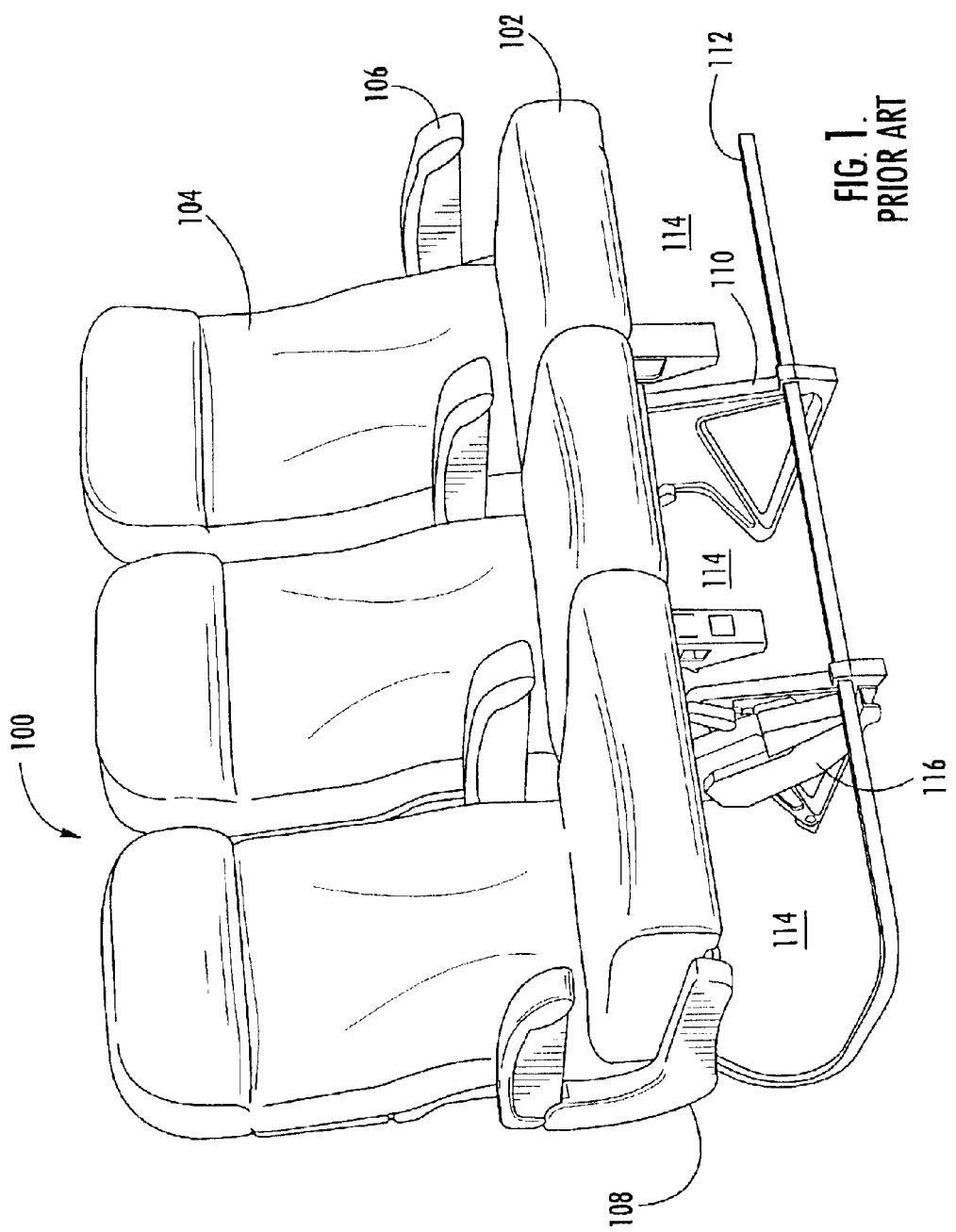
FIG. 1 is a perspective view of a prior art three-seat assembly incorporating a seat electronics unit.

FIG. 1 illustrates a prior art passenger seat unit 100 arranged in a three-seat set. Each individual seat comprises a seat bottom 102 and a seat back 104. An arm rest 106 is disposed at each end of the seat unit 100 and in between the individual seats. All of the seats are carried by a seat frame 108 which is itself secured to a plurality of seat bases 110. The seat bases 110 include provisions for mounting them to aircraft seat mounting tracks (not shown) in a known fashion. A baggage guard rail 112 is attached to the bottom front of each seat base 110. The baggage guard rail 112 extends laterally across the front of the seat unit 100, curves around the end of the seat unit 100 and then extends upward to terminate at the seat frame 108. The open spaces contained under the seat bottoms, between the seat bases, and behind the baggage guard rail define individual storage areas 114. A seat electronics unit 116 is attached to one of the seat bases 110. As can be seen in FIG. 1, the seat electronics unit protrudes into one of the storage spaces 114. This consumes already limited space. Furthermore, passengers often force luggage or parcels into the storage spaces 114 which can damage the seat electronics unit 116.

Figure 2:
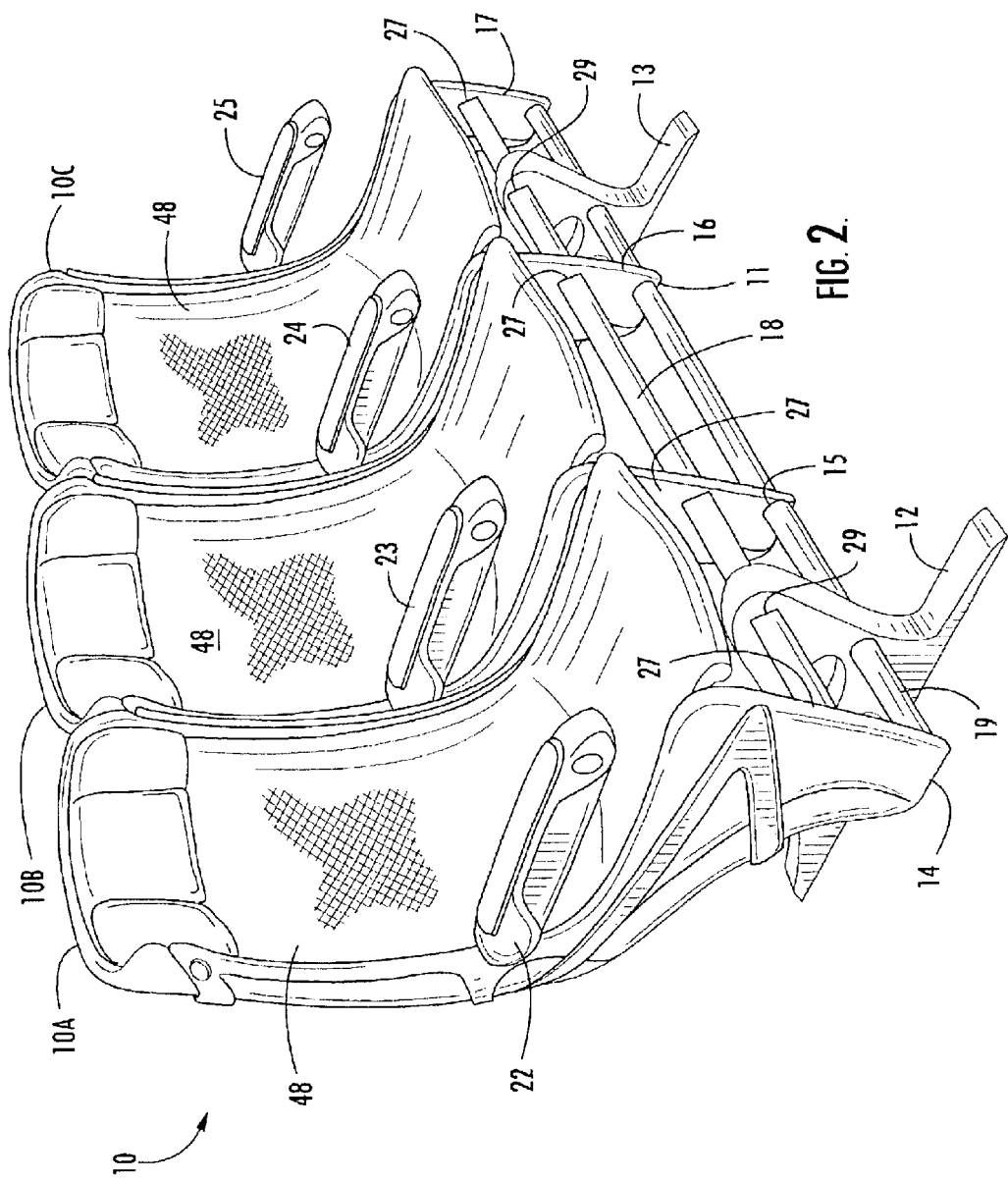
FIG. 2 is a perspective view of a three-seat assembly according to a preferred embodiment of the invention.

A three-seat set according to the present invention is illustrated in FIG. 2 and shown generally at reference numeral 10 and comprises individual joined seats 10A, 10B, 10C that are movable from an upright to a recline position without encroaching on an aft-seated passenger. This type of seating is conventionally referred to as "coach" or "main cabin" seating as distinct from larger and more complex first class or business class seating. As will be seen below, the features of this invention are also applicable to first and business class seating. The seat set 10 includes a seat base 11. The seat base 11 includes a pair of leg assemblies 12 and 13 for being attached to a supporting surface by means of conventional track fittings such as disclosed in applicant's U.S. Letters Pat. Nos. 4,776,533; 5,169,091 and 5,871,318. Each leg assembly includes a central beam mounting point 29. Four seat frames 14, 15, 16 and 17 are connected by single laterally-extending beam 18. A baggage guard rail 19 prevents baggage stowed under the seats 10A, 10B, 10C from sliding forward into the leg area of the passengers.

The beam 18 represents a radical departure from conventional seat design, where a pair of parallel fore-and aft beams provide support to the entire seat structure. The beam 18 extends laterally across the front of each of the seats 10A, 10B, 10C. The beam 18 may be of any suitable cross-section. A triangular shape is shown in FIG. 1.

Each seat 10A, 10B, 10C thus includes a pair of the shared, laterally spaced-apart seat frames 14, 15, 16 and 17, each of which has a curved shape generally corresponding to the profile of an anatomically-appropriate generally horizontal seat bottom and generally vertical seat back, and includes an extension to the floor. Each seat frame includes a beam mounting point 27. Arm rests 22, 23, 24 and 25 are pivotally-mounted on respective seat frames 14, 15, 16 and 17.

Each of the seats 10A, 10B, 10C, has a diaphragm 48 in the form of a fabric seat suspension material. The material 48 provides a seating surface and is stretched under tension onto curved, semi-rigid diaphragm supports (not shown) which are carried by seat frames in alignment with the curved shape of the seat frames.

Figure 3:
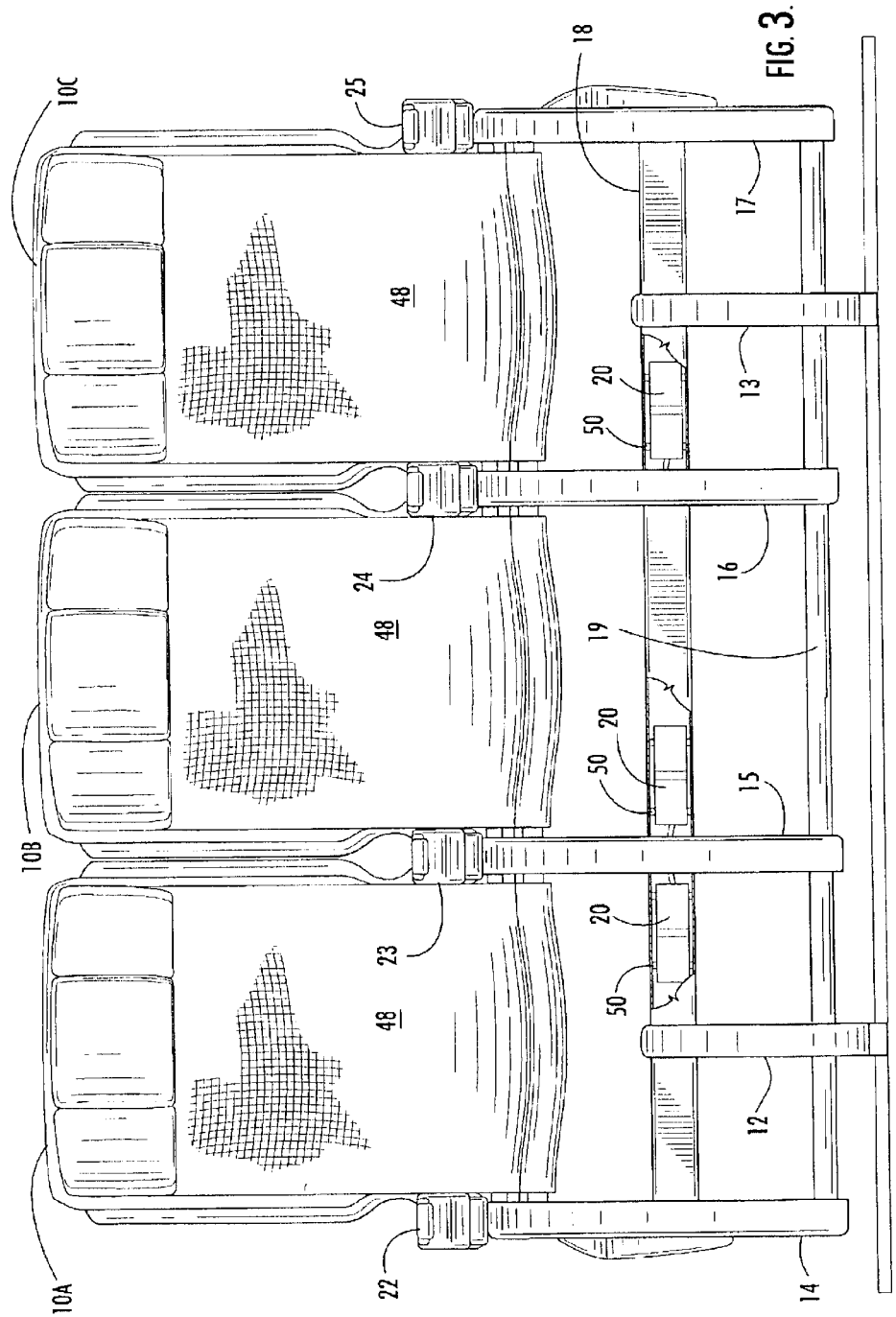
FIG. 3 is front view of the seat assembly shown in FIG. 2, with interior components shown.

FIG. 3 shows a front view of the seat set 10. One or more seat electronics units 20 are disposed inside the beam 18, as shown at the cut-away sections in the Figure. Typically, one seat electronics unit 20 is provided for each seat 10A, 10B, and 10C. The seat electronics unit 20 differs from the prior art seat electronics unit 116 in that its housing is sized and shaped to fit into the interior of the beam 18, as described in more detail below. Small brackets, feet, or resilient pads 50 may be disposed between the seat electronics unit 20 and the interior of the beam 18 to position the seat electronics unit 20 or cushion it from shock.

Figure 4:
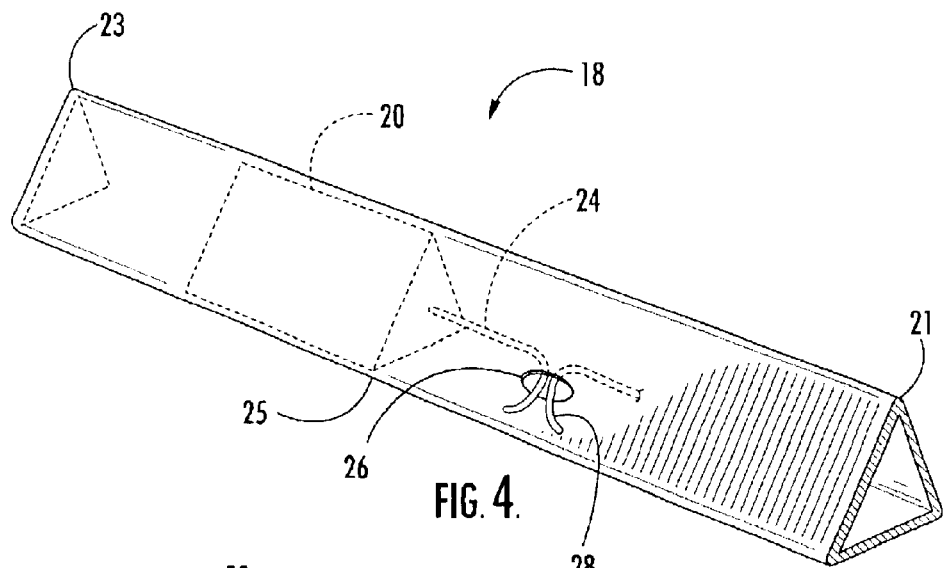
FIG. 4 is a perspective view of a portion of a beam assembly according to a preferred embodiment of the invention.

FIG. 4 shows a portion of the beam 18 shown in FIG. 3. The beam 18 comprises a hollow body having first and second ends 21 and 23, and a central portion 25. The beam 18 may be constructed of any material which gives adequate strength and low weight, some examples of which are a carbon-fiber containing composite material, and aluminum.

The beam 18 may also be constructed of an amorphous alloy of a known type. An amorphous alloy is an alloy which is glass-like in structure, lacking a crystalline lattice. Amorphous alloys have certain advantages over conventional alloys, for example they are capable of exhibiting yield strength greater than titanium, while having a weight and cost similar to aluminum. Amorphous alloys are resistant to work hardening and they can be formed into complex shapes in a manner similar to injection molding. One example of a suitable amorphous alloy has the following approximate composition, in weight percent: 41.2 Zirconium, 22.5 beryllium, 13.8 titanium, 12.5 copper, nickel 10.0. Such alloys are available from Liquidmetal Technologies, Tampa, Fla. 33602 USA.

The seat electronics unit 20 is shown mounted in the interior of the beam 18. In the illustrated example the housing of the seat electronics unit 20 matches the shape of the interior of the beam 18 and is sized to provide a snug fit in the interior of the beam. A cable 24 of an appropriate type extends from the seat electronics unit 20 and exits the beam 18 through an opening 26 in one of its sides. from that point the cable 24 may be routed as required, for example it may be connected to an in-seat video display (not shown). Other cables 28 may also enter the beam through the same opening 26 as shown. If desired, the cables 24 and 28 may be routed out the end of the beam 18, as shown in FIG. 5.

Figure 5:
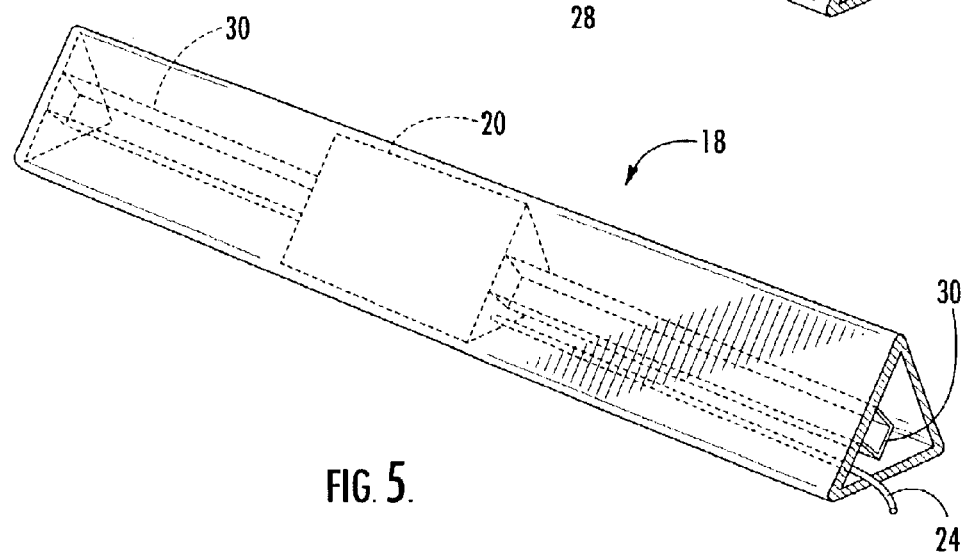
FIG. 5 is a view of a variation of the beam depicted in FIG. 4.

FIG. 5 shows a variation of the beam 18 in which one or more braces 30 such as the U-shaped channels shown are attached to the interior of the beam 18. The braces 30 bear against the ends of the seat electronics unit 20 and prevent it from moving within the beam 18. In addition to the structures described herein, any other known means capable of holding the seat electronics unit 20 in position may be used to secure the seat electronics units 20 inside the beam 18.

Figure 6:
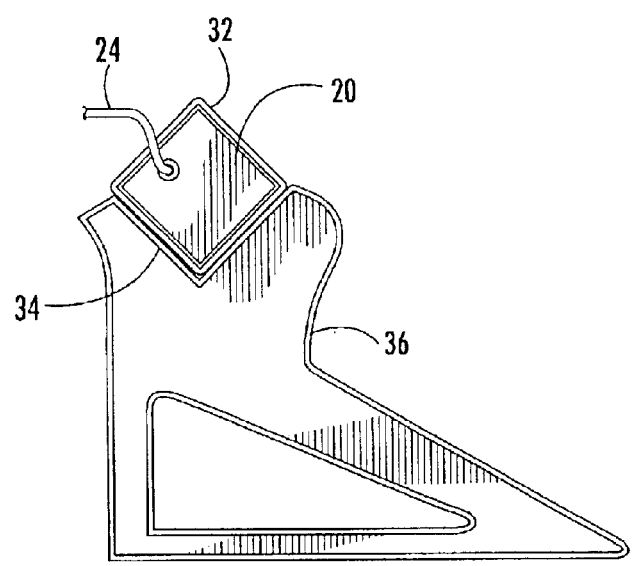
FIG. 6 is a side elevation view showing a portion of a seat frame assembly and a beam according to an alternative embodiment of the invention.

FIG. 6 shows a side view of a portion of an alternative seat frame assembly constructed according to the present invention. A beam 32 is similar to the beam 18, but has a 4-sided polygonal cross-section in the illustrated example. This polygonal shape is received in a complimentary V-shaped opening 34 in a seat frame 36. The beam 32 may then be secured to the seat frame 36, for example by welding or with adhesives. A seat electronics unit 20 is mounted inside the beam 32 as described above.

A passenger seat including a seat electronics unit is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A passenger seat comprising:

first and second spaced-apart seat frames, each of said seat frames defining a curved shape corresponding to a profile of an anatomically-appropriate seat bottom and defining first and second beam mounting points respectively, said first and second beam mounting points being disposed at a front end of said seat bottom;

a seat base for being attached to a supporting surface, said seat base having a central beam mounting point disposed between said first and second beam mounting points;

a beam comprising a hollow body having a first end, a second end, and a central portion disposed between said first and second ends, wherein said first end is attached to said first beam mounting point, said second end is attached to said second beam mounting point, and said central portion is attached to said central beam mounting point such that loads applied to said seat frames by a seat occupant are transferred to said seat base through said beam, without use of a laterally-extending beam located at the rear of said seat bottom;

a diaphragm positioned under tension between said first and second seat frames for providing a continuous seat bottom and seat back support surface for a seat occupant; and at least one seat electronics unit disposed Inside said hollow body.

2. The passenger seat according to claim 1 further comprising at least one cable disposed inside said hollow body and connected to said electronics unit.

3. The passenger seat according to claim 1, wherein the cross-section of said beam comprises a plurality of sides.

4. The passenger se at according to claim 1, wherein the cross-section of said body is triangular.

5. The passenger seat according to claim 1, wherein the cross-section of said body is four-sided.

6. The passenger seat according to claim 1, wherein said body comprises carbon fibers.

7. The passenger seat according to claim 1, wherein said body comprises aluminum.

8. The passenger seat according to claim 1, wherein said body comprises an amorphous alloy.

9. A passenger seat frame assembly comprising:

first and second spaced-apart seat frames, each of said seat frames defining a curved shape corresponding to a profile of an anatomically-appropriate seat bottom and defining first and second beam mounting points respectively, said first and second beam mounting points adapted to be disposed at front end of said seat bottom;

a seat base for being attached to a supporting surface, said seat base having a central beam mounting point disposed between said first and second beam mounting points;

a beam comprising a hollow body having a first end, a second end, and a central portion disposed between said first and second ends, wherein said first end is attached to said first beam mounting point, said second end is attached to said second beam mounting point, and said central portion Is attached to said central beam mounting point such that loads applied to said seat frames by a seat occupant are transferred to said seat base through said beam, without use of a laterally-extending beam located at the rear of said seat bottom; and at least one seat electronics unit disposed inside said hollow body.

10. The passenger seat frame assembly according to claim 9 further comprising at least one cable disposed inside said hollow body and connected to said electronics unit.

11. The passenger seat frame assembly according to claim 9, wherein said body has a cross-section comprising a plurality of sides.

12. The passenger seat frame assembly according to claim 9, wherein the cross-section of said body is triangular.

13. The passenger seat frame assembly according to claim 9, wherein the cross-section of said body is four-sided.

14. The passenger seat frame assembly according to claim 9, wherein said body comprises carbon fibers.

15. The passenger seat frame assembly according to claim 9, wherein said body comprises aluminum.

16. The passenger seat frame assembly according to claim 9, wherein said body comprises an amorphous alloy.

17. The passenger seat frame assembly of claim 9 wherein said first and second beam mounting points each comprise an opening having a shape complementary to the shape of said first and second ends of said beam, respectively.

* * * * *

UNITED STATES PATENT AND TRADEMARK OFFICE
CERTIFICATE OF CORRECTION

PATENT NO. : 6,824,213 B2 Page 1 of 1
APPLICATION NO. : 10/424461
DATED : November 30, 2004
INVENTOR(S) : Skelly et al.

It is certified that error appears in the above-identified patent and that said Letters Patent is hereby corrected as shown below:

Column 5, line 15, delete "Inside" and enter --inside--.

Column 6, line 10, delete "Is" and enter --is--.

Signed and Sealed this

Fifth Day of June, 2007

JON W. DUDAS
*Director of the United States Patent and Trademark Office*